United States Patent [19]

Heuvelsland

[11] Patent Number: 5,114,619
[45] Date of Patent: May 19, 1992

[54] PRODUCTION OF POLYETHER POLYOLS WITH REDUCED UNSATURATION

[75] Inventor: A. J. Heuvelsland, Heikant, Netherlands

[73] Assignee: The Dow Chemical Company, Midland, Mich.

[21] Appl. No.: 381,220

[22] Filed: Jul. 14, 1989

[51] Int. Cl.⁵ .............. C07C 43/10; C07C 43/196; C07C 43/23

[52] U.S. Cl. .................. 252/182.27; 536/120; 568/613; 568/618; 568/619; 568/620

[58] Field of Search ........... 252/182.27; 536/120; 568/613, 618, 619, 620

[56] References Cited

U.S. PATENT DOCUMENTS

| | | | |
|---|---|---|---|
| 3,393,243 | 7/1968 | Cuscurida | 568/618 |
| 4,210,764 | 7/1980 | Yang et al. | 568/618 |
| 4,223,164 | 9/1980 | Yang et al. | 568/618 |
| 4,239,917 | 12/1980 | Yang | 568/618 |
| 4,282,387 | 8/1981 | Olstowski et al. | 568/618 |
| 4,302,613 | 11/1981 | Yang et al. | 568/620 |
| 4,306,093 | 12/1981 | Yang et al. | 568/618 |
| 4,453,022 | 6/1984 | McCain et al. | 568/620 |
| 4,453,023 | 6/1984 | McCain et al. | 568/618 |
| 5,010,187 | 4/1991 | Heuvelsland | 521/159 |

FOREIGN PATENT DOCUMENTS

| | | |
|---|---|---|
| 0026544 | 4/1981 | European Pat. Off. |
| 0026546 | 4/1981 | European Pat. Off. |
| 0046947 | 3/1982 | European Pat. Off. |
| 0049358 | 4/1982 | European Pat. Off. |
| 0268920 | 6/1988 | European Pat. Off. |
| 61-134335 | 6/1986 | Japan |

Primary Examiner—John Kight, III
Assistant Examiner—Rabon Sergent

[57] ABSTRACT

This invention is a process for the preparation of a polyol having an equivalent weight of 200 to 5000 by the reaction of a monoepoxy compound with an initiator containing an active hydrogen atom in the presence of a catalyst substance selected from the group consisting of barium, strontium and their oxides, hydroxides, hydrated hydroxides or monohydroxide salts, and mixtures thereof. The process comprises adding water during the reaction of the monoepoxy compound with the initiator. The quantity of water added is one percent or less by weight of the total weight of monoepoxy compound to be reacted with the initiator.

16 Claims, No Drawings

PRODUCTION OF POLYETHER POLYOLS WITH REDUCED UNSATURATION

FIELD OF INVENTION

This invention relates to a process for the preparation of polyether polyols having reduced amounts of unsaturation.

BACKGROUND OF THE INVENTION

Polyols for use in preparing polyurethanes are usually prepared by the reaction of an initiator compound having active hydrogen atoms with an alkylene oxide in the presence of a basic alkoxylation catalyst such as a tertiary amine, or a hydroxide or alkoxide of sodium and potassium. However, the use of these catalysts, although commonplace, can lead to the production of polyols which may contain high levels of unsaturation, especially when such polyols are of high equivalent weight.

In the base-catalyzed addition of propylene oxide to initiators containing active hydrogen atoms, the growing polyether chains are terminated predominantly with secondary hydroxy groups. However, under the conditions of the reaction, temperature, pressure and catalyst concentration, the propylene oxide may isomerize and rearrange to give an unsaturated allyl alcohol before it can react with the initiator.

The ability to prepare high equivalent weight products in the presence of the allyl alcohol is reduced as the allyl alcohol contains an active hydrogen which can react with propylene oxide, thereby limiting molecular weight build-up on the desired initiator. The problem of unsaturation becomes more severe as the desired equivalent weight of the polyol becomes greater When polyols of high equivalent weight and high unsaturation are used in the preparation of polyurethane polymers such as flexible foams, products with undesirable properties can result. Problems such as foam discoloration, inferior compressive and tensile strengths, low reactivity, low flexural modulus and poor humid aging may be encountered. It is therefore desirable to provide a means of reducing unsaturation in such polyols, so allowing for the manufacture of improved polyurethane polymers.

The types of terminal unsaturation and means of reducing it by acid treatment of the end product are discussed by Dege et al., *Journal of the American Chemical Society*, p. 3374, Vol. 81 (1959).

Unsaturation in polyols to be used in preparing polyurethane polymers can be reduced by acid treatment of the product as described in U.S. Pat. Nos. 2,996,550 and 3,271,462.

U.S. Pat. No. 3,393,243 teaches the use of the Group IA metal catalyst caesium hydroxide for the preparation of polyoxypropylene polyether polyols having an equivalent weight of 1500 to 2500 and reduced levels of unsaturation. This catalyst is much more costly than the alternative basic catalysts, as it is required in larger quantities to operate at an equivalent molar concentration due to the high molecular weight of caesium.

The use of caesium hydroxide as catalyst in the alkoxylation reaction of alcohols giving products with low unsaturation levels has recently been documented. See patents EP 268,922-A and EP 268,920-A.

It is desirable to develop a process which can achieve the preparation of polyether polyols with reduced unsaturation and reduce or eliminate the use of expensive catalysts such as caesium hydroxide and/or the acid treatment of the reaction product.

The use of barium-containing catalysts in the presence of catalyst promoters is described for the ethoxylation reactions of alkanols to make nonionic surfactants, see, for example, U.S. Pat. Nos. 4,210,764; 4,239,917 and EP 46,947.

The Japanese patent 55/092,733-A teaches the use of barium hydroxide in combination with a carbon dioxide finishing process for the preparation of preferably ethylene oxide containing polyether polyols having equivalent weights of 187 or less. The products so produced are suitable for the preparation of rigid or semi-rigid polyurethane foam due to their very low residual alkoxylation catalyst content In a recent patent application titled "Production of Polyether Polyols With Reduced Unsaturation", filed Nov. 18, 1988, Ser. No. 273,375; a process for the preparation of polyols having an equivalent weight from 200 to 5000 and reduced levels of unsaturation in the presence of an alkoxylation catalyst containing barium and/or strontium is disclosed.

It is therefore an object of the present invention to provide an alternative process for producing polyols with low levels of unsaturation

SUMMARY OF THE INVENTION

It has now surprisingly been discovered that polyether polyols of high equivalent weights with improved properties including reduced levels of unsaturation can be prepared by a process comprising the controlled addition of water during the alkoxylation stage in the preparation of the polyol.

In one aspect, this invention is a process for preparing a polyol having an equivalent weight of 200 to 5000 which comprises reacting a monoepoxy compound with an initiator containing an active hydrogen atom in the presence of a catalyst substance selected from the group consisting of barium, strontium and their oxides, hydroxides, hydrated hydroxides or monohydroxide salts, and mixtures thereof, and in the presence of up to 1 percent by weight, based on total weight of monoepoxy compound, of water added during the reaction of monoepoxy compound with initiator.

In a second aspect, this invention is a polyol produced by the process of the invention.

In a third aspect, this invention is a polyol composition comprising from 0.1 to 99.9 percent by weight of a polyol produced by the process of the invention.

In a fourth aspect, this invention is a polyurethane polymer prepared by a reaction comprising contacting an organic polyisocyanate with a polyol prepared by the process of the invention.

DETAILED DESCRIPTION OF THE INVENTION

As described hereinabove a polyol having an equivalent weight from about 200 to 5000 and low unsaturation levels can be prepared by the alkoxylation of an initiator containing an active hydrogen atom with a monoepoxy compound in the presence of a catalyst consisting of barium or strontium and their oxides, hydroxides, hydrated hydroxides or monohydroxides, salts or mixtures thereof, and wherein during the course of the alkoxylation reaction a controlled quantity of water is added.

The quantity of water to be added during the reaction is sufficient to bring about a reduction in the unsaturation level of the final alkoxylation product. The quantity of water required to achieve this may vary with the type of initiator, monoepoxy compound and reaction conditions being employed. Generally, the quantity of water is up to one percent by weight, based on total weight of monoepoxy compound reacting with initiator. Advantageously, the quantity of water is from about one part by weight for each 100 to 20000, preferably about one part by weight for each 1000 to 7000, and more preferably from about one part by weight for each 3000 to 5000 parts by weight of total weight monoepoxy compound to be reacted with the initiator.

The mode of addition of water is not critical and is principally dependent on equipment and instrumentation available. The addition of water can be by a stepwise procedure comprising addition of one or more increments during the feeding of the monoepoxy compound to the reaction or alternated with the addition of monoepoxy compound to the reaction. Alternatively, an addition mode comprising a continuous addition of water simultaneously with the monoepoxy compound may be employed. In the latter case the water and monoepoxy compound depending on the equipment available, can be fed as a combined stream or individual streams. Whenever possible, for reasons of economics and equipment productivity, it is desirable to add the water by a continuous addition procedure. By the term "continuous" it is understood that water and monoepoxy feed start and terminate at the same time.

When the water is added in a step-wise procedure, advantageously, an initial amount of monoepoxy compound is reacted with the initiator prior to the first addition of water. The initial amount of monoepoxy compound added need only be as little as 5 percent of the total monoepoxy feed required to produce the product of desired equivalent weight, but preferably is at least 15 percent, and more preferably at least 25 percent of the total monoepoxy feed required.

An active hydrogen atom of the initiator for the purpose of this invention is defined as a hydrogen atom which is part of an active hydrogen-containing group and will react positively in the well-known Zerewitinoff test. See Kohler, *Journal of the American Chemical Society*, p. 3181, Vol. 49 (1927). Representative active hydrogen-containing groups include —OH, —COOH, —SH and —NHR where R can be hydrogen, alkyl, cycloalkyl, aryl aromatic and the like. Preferred active hydrogen-containing groups for use in the present invention are hydroxyl groups.

The hydroxyl groups of the initiator can be of primary or secondary character. It can be advantageous for reasons of catalyst solubility to have an initiator or initiator mixture which has a primary hydroxyl content.

Suitable initiators for preparation of polyols by the process of this invention are those having from two to eight, preferably from two to four active hydrogen atoms per molecule and an equivalent weight of from 5 to 1500 and preferably from 9 to 750, more preferably from 50 to 550 and most preferably from 80 to 300.

Examples of suitable initiators include water, glycerine, trimethylolpropane, pentaerythritol, hexane triol and various isomers, carbohydrate compounds such as lactose, α-methylglucoside, α-hydroxyethylglucoside, hexitol, heptitol, sorbitol, dextrose, mannitol, sucrose and amine compounds such as ammonia, ethylenediamine, diethylenetriamine, aminoethylpiperazine, aniline, diaminotoluene and aromatic compounds such as the condensates of a phenol with acetone or formaldehyde or the condensation product of a phenol with formaldehyde and an alkanolamine, mixtures thereof and the like. Other suitable initiators also include polyoxyalkylene glycols and other polyoxyalkylene polyols. Other initiators which can be employed include those disclosed in U.S. Pat. Nos. 4,269,945 and 4,394,431, all of which are incorporated herein by reference.

The preferred initiators include water, ethylene glycol, 1,2-propylene glycol, 1,3-propylene glycol, the various isomers of butylene glycol, pentylene glycol and hexylene glycol, glycerine, trimethylolpropane, pentaerythritol, ethylenediamine and their polyoxyalkylene adducts, mixtures thereof and the like.

Suitable monoepoxy compounds for use in this invention include the α- and β-alkylene oxides and halogenated and aryl-substituted derivatives thereof, glycidyl ethers having from about 3 to about 20 carbon atoms, cyclic ethers such as tetrahydrofuran, mixtures thereof and the like.

Exemplary of suitable alkylene oxides are ethylene oxide, propylene oxide, 1,2-butylene oxide, 2,3-butylene oxide, styrene oxide, glycidol, epichlorohydrin, mixtures thereof and the like.

Exemplary of suitable glycidyl ethers are allyl glycidyl ether, phenyl glycidyl ether, butyl glycidyl ether mixtures thereof and the like.

The preferred monoepoxy compounds for use in the process according to this invention include ethylene oxide, propylene oxide, 1,2-butylene oxide, 2,3-butylene oxide and mixtures thereof. The process of this invention is particularly suited to the preparation of polyols when the monoepoxy compound reacting with the initiator includes propylene oxide or butylene oxide. Of these, propylene oxide is more susceptible than other oxides to isomerization resulting in unsaturation. Ethylene oxide does not give unsaturation via the same isomerization route. A proposed mechanism by which ethylene oxide can result in unsaturation is reviewed in the published patent application EP268,922-A.

The quantities and types of oxide, and feed sequence (random or block) depend on the eventual equivalent weight of the product to be prepared and what the intended polyurethane application is to be. For example, when polyols of high reactivity are required, the feed sequence will terminate with ethylene oxide to give products containing primary hydroxyl groups.

The polyols prepared according to the process have an equivalent weight from about 200 to about 5000, preferably from about 500 to about 4000 and more preferably from about 1000 to 2500. Advantageously, when such polyols are prepared, the total weight of monoepoxy compound reacting with the initiator comprises at least 45, preferably at least 60 and more preferably at least 70, and up to 100 percent by weight of propylene oxide and/or butylene oxide. In addition, the polyols should have a total unsaturation content of less than 0.100, preferably less than 0.050, more preferably less than 0.040 and most preferably less than 0.020 milliequivalents/gram polyol.

Optionally, when high polyol reactivity is desired, the polyol will contain end primary hydroxyl groups obtained by advantageously reacting ethylene oxide in the final stage of the alkoxylation reaction. Such polyols are termed EO capped polyols. The quantity of ethylene oxide used as a cap on the polyoxyalkylene polyol will depend on the overall polyol reactivity desired and the equivalent weight of the end product. U.S. Pat. No. 4,440,705, incorporated herein by reference, teaches the EO requirements with respect to primary hydroxyl content and polyol equivalent weight when using potassium hydroxide as the alkoxylation catalyst. Advantageously, sufficient quantities of EO are used to give a product having at least 25 percent, preferably at least 45 percent, and more preferably at least 65 percent primary hydroxyl content of the total polyol hydroxyl content.

The catalysts used in accordance with the process of this invention to promote the alkoxylation reaction include barium, strontium and their oxides, hydroxides, hydrated hydroxides, monohydroxide salts or mixtures thereof. The preferred catalysts are barium hydroxide, hydrated barium hydroxide and monohydroxide barium salts or mixtures thereof and the equivalent strontium compounds. Especially preferred is barium hydroxide monohydrate.

When preparing polyols by the process of this invention, the concentration of the catalyst is such so as to provide for the manufacture of the product in an acceptable time. Advantageously, at least 100 ppm, and preferably at least 500 ppm of metal cation based upon the weight of initiator present is suitable for catalyzing the reaction. Preferably, the catalyst is present in an amount from about 0.01 to about 50, more preferably from about 0.01 to about 30, and most preferably from about 0.01 to about 15 percent by weight based upon the weight of the initiator to be reacted.

The quantity of catalyst used to catalyze the reaction should be such that the resulting crude product, prior to neutralization or treatment to remove residual catalyst, contains less than about 20,000, preferably less than about 10,000 and most preferably less than about 5,000 ppm of the metal based on the weight of the end product present. After removal and/or neutralization of the catalyst, the metal cation content of the polyol advantageously is less than about 500 ppm, preferably less than about 100 ppm and more preferably less than about 50 ppm. Catalyst concentrations over and above these ranges are generally not beneficial to the use of the product in the preparation of polyurethanes.

In accordance with the process of the invention the reaction is advantageously conducted at a temperature within the range of 60° C. to 180° C., preferably within the range of 75° C. to 130° C. and more preferably within the range of 80° C to 125° C. The reaction is normally conducted in a closed system at a pressure normally not exceeding 150 pounds per square inch gauge (psig), preferably not exceeding 120 psig and most preferably not exceeding 75 psig. These pressures are maintained by controlling the feed rates of the alkylene oxide(s) and thus the quantity of oxide in the gaseous phase at the reaction temperature. Temperatures and pressures over and above these ranges are generally not beneficial to the quality of resultant product obtained, and products with a high level of color or unsaturation may be produced.

The residual catalyst in the polyols produced by the process of this invention may be neutralized and/or removed by any of the procedures well-known to those skilled in the art, for example, neutralization of the catalyst by acids such as phosphoric acid, sulfuric acid, acetic acid and solid organic acids as described in U.S. Pat. No. 3,000,963. The catalyst may also be removed by the carbon dioxide finishing procedure as described in the Japanese Patent 55/092,733-A, or removed by adsorption on activated clay such as, for example, magnesium silicate.

The polyols produced by the process of the invention may be reacted with polyisocyanates to produce polyurethane polymers or blended with other active hydrogen-containing compounds to provide compositions. Such compositions can have a variety of uses including the preparation of polyurethane polymers. A polyol composition can comprise from 0.1 to 99.9 percent by weight of one or more polyols prepared by the process of this invention.

When the polyols prepared by the process of this invention are reacted with polyisocyanates to manufacture polyurethane polymer the reaction optionally comprises other active hydrogen-containing compounds, catalysts, surfactants, stabilizers, fillers, dyes, flame retardants, blowing agents and other additives. Suitable processes for the preparation of polyurethane polymers are discussed in U.S. Pat. Nos. RE 24514, 3,821,130, and G.B. patent 1,534,258 which are herein incorporated by reference. Suitable equipment and processes for the preparation of polyurethane polymers are further discussed by J. H. Saunders and K. C. Frisch in *Polyurethanes Chemistry and Technology* Volumes I and II. R. E. Krieger Publishing Company, Inc., ISBN 0-89874-561-6, incorporated herein by reference.

The polyols prepared by the process of the invention are useful for the manufacture of polyurethane polymers in a variety of application areas. Areas include flexible slabstock and molded foam, carpet backing and rigid foams for laminate and insulative applications. Non-cellular polyurethane polymers may also be prepared including elastomers suitable for use as coatings, shoe soles and molding applications.

In addition, polyols prepared according to the invention may also be used to modify polyisocyanates in the preparation of isocyanate-terminated prepolymers.

ILLUSTRATIVE EMBODIMENTS

The following examples are given to illustrate the invention and should not be interpreted as limiting it in any way. Unless stated otherwise, all parts and percentages are given by weight. Unless otherwise stated, the feed rate of the monoepoxy compound is such so as to maintain a constant pressure in the reactor of about 40 to 60 psig until the desired quantity has been fed to the reaction.

The equivalent weight of the products produced is calculated from the hydroxyl number as observed by procedure ASTM E 326-69.

$$\text{equivalent weight} = \frac{56100}{\text{observed hydroxyl number}}.$$

Total unsaturation levels are determined by procedure ASTM D 2849-69. Al unsaturation values relate to products in which the catalyst has been neutralized and/or removed by filtering.

EXAMPLE 1

This example illustrates production of a polyol where the water is introduced by a step-wise procedure An initiator mixture of 100 parts of a polyoxypropylene triol having a molecular weight of 490 and 8.5 parts of barium hydroxide monohydrate is heated and flashed until all hydroxide is dissolved. By the term "flashed" it is meant that water is removed by use of pressures below one atmosphere. The reduced pressures are sufficient to remove water, but not other volatile organic compounds. Flashing is carried out until the free water content of the mixture is reduced to about 2500 ppm. The resulting initiator mixture contains 7.9 percent by weight barium hydroxide, expressed as monohydrate.

To 20 parts of the resulting initiator mixture at a temperature of 120° C. is fed 50 parts of propylene oxide at such a rate to maintain a constant pressure of about 45 to 60 psig. This is then followed by a feed of 0.037 part of water, whilst maintaining the temperature and pressure.

A further 50 parts of propylene oxide followed again by 0.037 part of water is fed to the reaction mixture and finally a third addition of 52 parts of propylene oxide followed by a third addition of 0.037 part of water is fed to the reaction mixture. Thus to 20 parts of this initiator mixture, a total of 152 parts of propylene oxide and 0.111 parts of water is fed.

The weight ratio of water to propylene oxide is 1:1370.

When the propylene oxide feed and water feed is complete, the reaction mixture is maintained at a temperature of 120° C. until the reactor pressure is constant with time.

When the constant pressure is obtained, residual alkoxylation catalyst is removed by treating the crude reaction product with magnesium silicate and filtering. Following this the pressure in the reactor is reduced to about 0.10 bar for about one hour and any volatile products removed.

The resulting reaction product obtained has a molecular weight of 4350, equivalent weight 1450, and a total unsaturation of 0.036 meq/g (milliequivalents/gram).

EXAMPLE 2

This example illustrates production of a polyol where the water is introduced by a continuous procedure To 20 parts of the initiator mixture of Example 1 is fed a total of 152 parts of propylene oxide and 0.149 part of water at a reaction temperature of 120° C. at such a rate so as to maintain a constant pressure of about 45-60 psig. The propylene oxide and water are fed as independent streams at such a rate that the feeds start and terminate at the same time. The weight ratio of water to propylene oxide is 1:1016.

When feeding of the propylene oxide and water is complete, the reaction product is treated as described for Example 1.

The resulting reaction product obtained has a molecular weight of 4400, equivalent weight 1467 and a total unsaturation of 0.036 meq/g.

EXAMPLE 3

This example follows the procedure of Example 2

To 20 parts of the initiator mixture of Example 1 is added a total of 152 parts of propylene oxide and 0.037 part of water.

The parts by weight ratio of water to propylene oxide is 1:4031.

The resulting product has a molecular weight of 4350, equivalent weight 1450 and a total unsaturation of 0.036 meq/g.

EXAMPLE 4

This example follows the procedure of Example 2

To 20 parts of the initiator mixture of Example 1 is added a total of 152 parts of propylene oxide and 0.089 part of water.

The weight ratio of water to propylene oxide is 1:17000.

The resulting product has a molecular weight of 4450, equivalent weight 1483 and a total unsaturation of 0.041 meq/g.

EXAMPLE 5

This example illustrates production of a diol, where the water is introduced by a continuous procedure An initiator mixture of 100 parts of a polyoxypropylene diol having a molecular weight of 400 and 11 parts of barium hydroxide monohydrate is heated and flashed until all hydroxide is dissolved. Flashing is carried out until the water content of the mixture is reduced to about 2500 ppm. The resulting initiator mixture contains 10.1 percent by weight barium hydroxide monohydrate.

To 20 parts of the resulting initiator mixture is fed a total of 190 parts of propylene oxide and 0.051 part of water at a reaction temperature of 120° C. at such a rate so as to maintain a constant pressure of about 45-60 psig. The propylene oxide and water are fed as independent streams at such a rate that the feeds start and terminate at the same time. The weight ratio of water to propylene oxide is 1:3725.

When feeding of the propylene oxide and water is complete, the reaction product is treated as described for Example 1.

The resulting reaction product obtained has a molecular weight of 3300, equivalent weight 1650 and a total unsaturation of 0.042 meq/g.

Substitution of the water in the process by low molecular weight diols, triols and other polyoxyalkylene glycols does not provide for the similar improvement in the process resulting in reduction of unsaturation levels. Similarly; substituting the above-mentioned alkoxylation catalysts of the process by other conventional alkoxylation catalysts such as potassium hydroxide does not provide for similar improvements in the unsaturation levels of the resulting products.

What is claimed is:

1. A process for preparing a polyol having an equivalent weight of 500 to 4000 which comprises reacting a monoepoxy compound comprising propylene oxide or butylene oxide with an initiator containing an active hydrogen atom in the presence of a catalyst substance selected from the group consisting of barium strontium and their oxides, barium and strontium hydroxides, barium and strontium hydrated hydroxides or barium and strontium monohydroxide salts, or mixtures thereof, and in the presence of water added during the reaction of monoepoxy compound with initiator, wherein the quantity of water is from about one part by weight for 100 to 20000 parts by weight of monoepoxy compound.

2. The process of claim 1 wherein the quantity of water is from about one part by weight for 1000 to 7000 parts by weight of monoepoxy compound.

3. The process of claim 2 wherein the quantity of water is from about one part by weight for 3000 to 5000 parts by weight of monoepoxy compound.

4. The process of claim 2 wherein the catalyst is selected from the group consisting of barium hydroxide, hydrated barium hydroxide, monohydroxide barium salts, or mixtures thereof.

5. The process of claim 1 wherein the initiator contains from 2 to 8 active hydrogen atoms per molecule and has an equivalent weight of from 5 to 1500.

6. The process of claim 5 wherein the initiator contains from 2 to 4 active hydrogen atoms per molecule.

7. The process of claim 1 wherein the monoepoxy compound additionally contains one or more of the alkylene oxides selected from the group consisting of ethylene oxide, styrene oxide, glycidol and epichlorohydrin.

8. The process of claim 7 wherein the additional monoepoxy compound is ethylene oxide.

9. The process of claim 1 wherein the catalyst is present in an amount from about 0.01 to about 50 percent by weight based upon the weight of initiator to be reacted.

10. The process of claim 1 wherein the reaction is carried out at a temperature of from 60° C. to 180° C. and at a pressure up to about 150 pounds per square inch gauge (psig).

11. The process of claim 2 wherein the addition of the quantity of water provides for a product with a reduced total unsaturation level.

12. The process of claim 11 wherein the polyol has a total unsaturation level of less than 0.050 milliequivalents/gram polyol.

13. The process of claim 12 wherein the polyol has a total unsaturation of less than 0.040 milliequivalents/gram polyol.

14. The process of claim 1 wherein an initiator containing from 2 to 8 active hydrogen atoms per molecule is reacted in the presence of from 0.1 to 50.0 percent by weight based upon weight of initiator present of barium hydroxide, hydrated barium hydroxide or a monohydroxide barium salt with a monoepoxy compound at a temperature of from 60° C. to 180° C. and at a pressure up to about 150 pounds per square inch gauge (psig), and wherein the addition of one part by weight of water per 100 to 20,000 parts by weight of monoepoxy compound is continuous during the reaction of monoepoxy compound with initiator.

15. A polyol produced by the process of claim 1.

16. A polyol composition comprising from 0.1 to 99.9 percent by weight of a polyol produced by the process of claim 1.

* * * * *